United States Patent [19]
Fukada et al.

[11] Patent Number: 5,845,047
[45] Date of Patent: Dec. 1, 1998

[54] METHOD AND APPARATUS FOR PROCESSING SPEECH INFORMATION USING A PHONEME ENVIRONMENT

[75] Inventors: Toshiaki Fukada; Yasunori Ohora, both of Yokohama; Yasuhiro Komori, Kawasaki; Takashi Aso, Yokohama, all of Japan

[73] Assignee: Canon Kabushiki Kaisha, Tokyo, Japan

[21] Appl. No.: 406,487

[22] Filed: Mar. 20, 1995

[30] Foreign Application Priority Data

Mar. 22, 1994 [JP] Japan ................................ 6-050415

[51] Int. Cl.$^6$ ..................................................... G10L 5/00
[52] U.S. Cl. ......................................... 395/2.77; 395/2.16
[58] Field of Search .................................. 395/2.69, 2.77, 395/2.65, 2.63, 2.14, 2.16

[56] References Cited

U.S. PATENT DOCUMENTS

| | | | |
|---|---|---|---|
| 4,736,429 | 4/1988 | Niyada et al. | 381/43 |
| 5,204,905 | 4/1993 | Mitome | 381/52 |
| 5,220,629 | 6/1993 | Kosaka et al. | 381/52 |
| 5,396,577 | 3/1995 | Oikawa et al. | 395/2.69 |
| 5,463,713 | 10/1995 | Hasegawa | 395/2.69 |
| 5,475,796 | 12/1995 | Iwata | 395/2.69 |

FOREIGN PATENT DOCUMENTS

| | | |
|---|---|---|
| 0481107 | 4/1991 | European Pat. Off. . |
| 0515709 | 12/1992 | European Pat. Off. . |
| 515 709 | 12/1992 | European Pat. Off. .......... G10L 5/04 |

OTHER PUBLICATIONS

"Assignment of Segmental Duration in Text–To–Speech Synthesis" by Jan. P. H. van Santen; Computer Speech & Languages 8(1994) Apr., No. 2 London, GB pp. 95–128.

Hirokawa et al., "High Quality Speech Synthesis System Based on Waveform concatenation of Phoneme Segment," IEICE Transactions on Fundamentals of Electronics, Communications and Computer Sciences: vol. 76A; No. 11, Nov. 1, 1993, pp. 1964–1980.

Young, "The General Use of Tying in Phoneme–Based HMM Speech Recognisers," Speech Processing 1, San Francisco, Mar. 23–26, 1992, vol. 1, pp. 569–572.

*Primary Examiner*—Allen R. MacDonald
*Assistant Examiner*—Susan Wieland
*Attorney, Agent, or Firm*—Fitzpatrick, Cella, Harper & Scinto

[57] ABSTRACT

A speech information processing apparatus includes a statistical processing unit for extracting features by performing statistical processing of a feature file formed by extracting features of speech, such as the fundamental frequency and its variations, and the power and its variations of speech, from a speech file, and a label file in which a phoneme environment, comprising the accent type, the number of moras, the mora position, phonemes and the like, is considered, and a pitch pattern forming unit for forming a pitch pattern, in which phoneme environment is considered, based on the result of the statistical processing.

23 Claims, 12 Drawing Sheets

FIG.2

| SPEECH-FILE NUMBER | PHONEME | START TIME | FINISH TIME |
|---|---|---|---|
| 1 | a | 100 | 149 |
| 1 | k | 150 | 179 |
| 1 | i | 180 | 240 |
| ⋮ | ⋮ | ⋮ | ⋮ |
| 20 | i | 130 | 189 |
| 20 | z | 190 | 229 |
| 20 | i | 230 | 290 |
| ⋮ | ⋮ | ⋮ | ⋮ |

FIG.3

| SPEECH-FILE NUMBER | NOTATION | READING | NUMBER OF MORAS | ACCENT TYPE |
|---|---|---|---|---|
| 1 | 空き | aki | 2 | 0 |
| 2 | 朝 | asa | 2 | 1 |
| 3 | 遊ぶ | asobu | 3 | 0 |
| ⋮ | ⋮ | ⋮ | ⋮ | ⋮ |
| 20 | 意地 | izi | 2 | 2 |
| 21 | 忙しい | isogasi- | 5 | 4 |
| 23 | いたわる | itawaru | 4 | 3 |
| ⋮ | ⋮ | ⋮ | ⋮ | ⋮ |

FIG.4

| SPEECH-FILE NUMBER | PHONEME CATEGORY | NUMBER OF MORAS | MORA POSITION | ACCENT TYPE | START POSITION | FINISH POINT |
|---|---|---|---|---|---|---|
| 1 | V | 2 | 1 | 0 | 100 | 149 |
| 1 | P | 2 | 2 | 0 | 150 | 179 |
| 1 | Vp | 2 | 2 | 0 | 180 | 240 |
| ... | ... | ... | ... | ... | ... | ... |
| 20 | V | 2 | 1 | 2 | 130 | 189 |
| 20 | Z | 2 | 2 | 2 | 190 | 229 |
| 20 | Vz | 2 | 2 | 2 | 230 | 290 |
| ... | ... | ... | ... | ... | ... | ... |

FIG.5

| PHONEME ENVIRONMENT | | | MEAN VALUE | | | STANDARD DEVIATION | | | TRANSITION PROBABILITY | | |
|---|---|---|---|---|---|---|---|---|---|---|---|
| NUMBER OF MORAS | MORA POSITION | ACCENT TYPE | FIRST STATE | SECOND STATE | THIRD STATE | FIRST STATE | SECOND STATE | THIRD STATE | FIRST STATE | SECOND STATE | THIRD STATE |
| 1 | 1 | 0 | 91.5 | 73.5 | 53.3 | 4.3 | 6.5 | 10.1 | 0.97 | 0.93 | 0.94 |
| 2 | 1 | 0 | 76.3 | 90.7 | 83.6 | 6.3 | 4.8 | 4.0 | 0.92 | 0.91 | 0.93 |
| 2 | 2 | 0 | 92.4 | 74.6 | 52.8 | 5.1 | 6.6 | 9.6 | 0.96 | 0.93 | 0.94 |
| 2 | 1 | 1 | 105.0 | 95.4 | 76.8 | 5.4 | 4.8 | 13.6 | 0.95 | 0.94 | 0.87 |
| 2 | 2 | 1 | 61.6 | 44.6 | 29.1 | 9.5 | 5.8 | 9.1 | 0.91 | 0.94 | 0.96 |
| 3 | 1 | 0 | 77.2 | 85.3 | 93.6 | 7.0 | 3.7 | 5.4 | 0.90 | 0.92 | 0.90 |
| 3 | 2 | 0 | 100.1 | 93.5 | 85.5 | 3.3 | 1.8 | 5.4 | 0.95 | 0.94 | 0.93 |
| ... | ... | ... | ... | ... | ... | ... | ... | ... | ... | ... | ... |

FIG.8

| PHONEME ENVIRONMENT | | | | MEAN VALUE | | | STANDARD DEVIATION | | | TRANSITION PROBABILITY | | |
|---|---|---|---|---|---|---|---|---|---|---|---|---|
| PHONEME CATEGORY | NUMBER OF MORAS | MORA POSITION | ACCENT TYPE | FIRST STATE | SECOND STATE | THIRD STATE | FIRST STATE | SECOND STATE | THIRD STATE | FIRST STATE | SECOND STATE | THIRD STATE |
| B | 4 | 1 | 0 | 77.8 | 56.9 | 75.0 | 18.6 | 5.7 | 6.4 | 0.79 | 0.95 | 0.89 |
| B | 4 | 1 | 1 | 79.4 | 61.1 | 80.4 | 19.9 | 5.1 | 9.8 | 0.77 | 0.96 | 0.92 |
| B | 4 | 2 | 0 | 79.2 | 89.5 | 96.4 | 6.0 | 2.7 | 3.4 | 0.88 | 0.89 | 0.89 |
| ... | ... | ... | ... | ... | ... | ... | ... | ... | ... | ... | ... | ... |
| b | 4 | 1 | 0 | 75.9 | 85.1 | 95.2 | 7.2 | 3.6 | 5.2 | 0.93 | 0.93 | 0.93 |
| b | 4 | 1 | 1 | 83.9 | 105.6 | 94.7 | 9.9 | 5.3 | 7.0 | 0.92 | 0.96 | 0.90 |
| b | 4 | 2 | 0 | 98.7 | 92.7 | 86.2 | 3.4 | 1.6 | 4.5 | 0.96 | 0.95 | 0.93 |
| ... | ... | ... | ... | ... | ... | ... | ... | ... | ... | ... | ... | ... |

METHOD AND APPARATUS FOR PROCESSING SPEECH INFORMATION USING A PHONEME ENVIRONMENT

BACKGROUND OF THE INVENTION

1. Field of the Invention

This invention relates to a method and apparatus for processing speech information in which in speech-information processing, such as systematic speech synthesis, speech recognition or the like, in order to generate a natural meter of a synthesized speech or to improve the speech recognition rate, statistical processing of features, such as the fundamental frequency and the power of a speech, and the like, is performed in consideration of phoneme environment, and a pitch-pattern model having a high probability of having high reliability.

2. Description of the Related Art

Speech is most naturally used from among means for exchanging information between people. On the other hand, computers have made so much progress that they not only perform numerical calculation but also deal with various kinds of information. Accordingly, there is a request to use a speech as means for exchanging information between a man and a computer.

In a systematic speech synthesis apparatus among such information exchanging means, a machine converts an arbitrary text into synthesized speech. Therefore, such an apparatus serves as important means for transmitting information from a computer to a human. However, synthesized speech output from a conventional speech synthesis apparatus is unnatural and mechanical compared with a natural speech generated by a man. One of reasons for this problem is that in the conventional technique, only a simple model is adopted in meter-generating rules for generating accent and intonation.

Accordingly, speech synthesized by such a simple model sounds mechanical to a human who hears the speech. Furthermore, speech recognition in which a change due to the phoneme environment is not considered causes a decrease in the recognition rate.

SUMMARY OF THE INVENTION

When statistically processing a file of features, such as the fundamental frequency and the power of speech, and the like, and a label file, the present invention achieves the following objects (items).

1) By using a context dependent HMM (Hidden Markov Model); i.e., the accent type, the number of moras, and the mora position, information relating to the variance, the mean value, the transistion probability of a pitch pattern is generated. Hence, a model having a high probability of high reliability can be automatically generated, and speech which is natural and close to speech pronounced by a human can be synthesized.

2) By using the context dependent HMM in which the phoneme environment (voiceless fricative, voiced plosive or the like) of the concerned phoneme is considered in addition to the accent type, the number of moras and the mora position described in item 1), information relating to the variance, the mean value, the transition probability and the like of a pitch pattern is generated for each phoneme environment. Hence, a model having a high probability of high reliability can be automatically generated, and speech which is natural and close to a speech pronounced by a human can be synthesized.

3) As for a category having a large amount of data, by considering phoneme environment of phonemes before and after the concerned phoneme, and the like in addition to the accent type, the number of moras, the mora position, and phoneme environment of the concerned phoneme described in item 2, a pitch pattern which is more precise than the pitch pattern obtained in item 2 is obtained, and speech which is natural and close to speech pronounced by a human can be synthesized.

4) By hierarchically configuring and utilizing the information described in items 1), 2) and 3), a precise pitch pattern model in which the phoneme environment and the like are considered can be selected from a pitch pattern model in which only a rough structure is shown, in accordance with the amount of data, and speech which is natural and close to speech pronounced by a human can be synthesized.

5) By preparing the hierarchically configured pitch pattern model described in item 4) and a recognition dictionary having accent information, speech recognition utilizing prosodic information can be performed, and the recognition rate can be increased.

According to one aspect, the present invention, which achieves these objectives, relates to a speech-information processing method comprising the steps of performing statistical processing of stored speech data in consideration of the phoneme environment using a feature file formed by extracting features from the speech data, and a label file obtained by analyzing the speech data so as to be processed for each phoneme environment, and forming a pitch pattern, in which the phoneme environment is considered, based on the data subjected to the statistical processing.

According to another aspect, the present invention relates to a speech-information processing apparatus comprising speech-file storage means for storing speech data, feature extraction means for forming a feature file by extracting features from the speech data stored in the speech file, analysis means for analyzing the speech data so as to be processed for each phoneme environment, and statistical processing means for performing statistical processing of the speech data stored in the speech file in consideration of the phoneme environment using data obtained from the feature extraction means and the analysis means, and pitch-pattern forming means for forming a pitch pattern, in which the phoneme environment is considered, based on data obtained from the statistical processing means.

The foregoing and other objects, advantages and features of the present invention will become more apparent from the following description of the preferred embodiments taken in conjunction with the accompanying drawings.

BRIEF DESCRIPTION OF THE DRAWINGS

FIG. 2 is a diagram illustrating labels;

FIG. 3 is a diagram illustrating a phoneme list;

FIG. 4 is a diagram illustrating a label file;

FIG. 5 is a diagram illustrating a pitch pattern table using the context dependent HMM; i.e., the accent type, the number of moras, and the mora position;

FIG. 8 is a diagram illustrating a pitch pattern table using a phoneme context dependent HMM, in which the phoneme category is also considered;

DESCRIPTION OF THE PREFERRED EMBODIMENTS

First Embodiment

Figure 12:
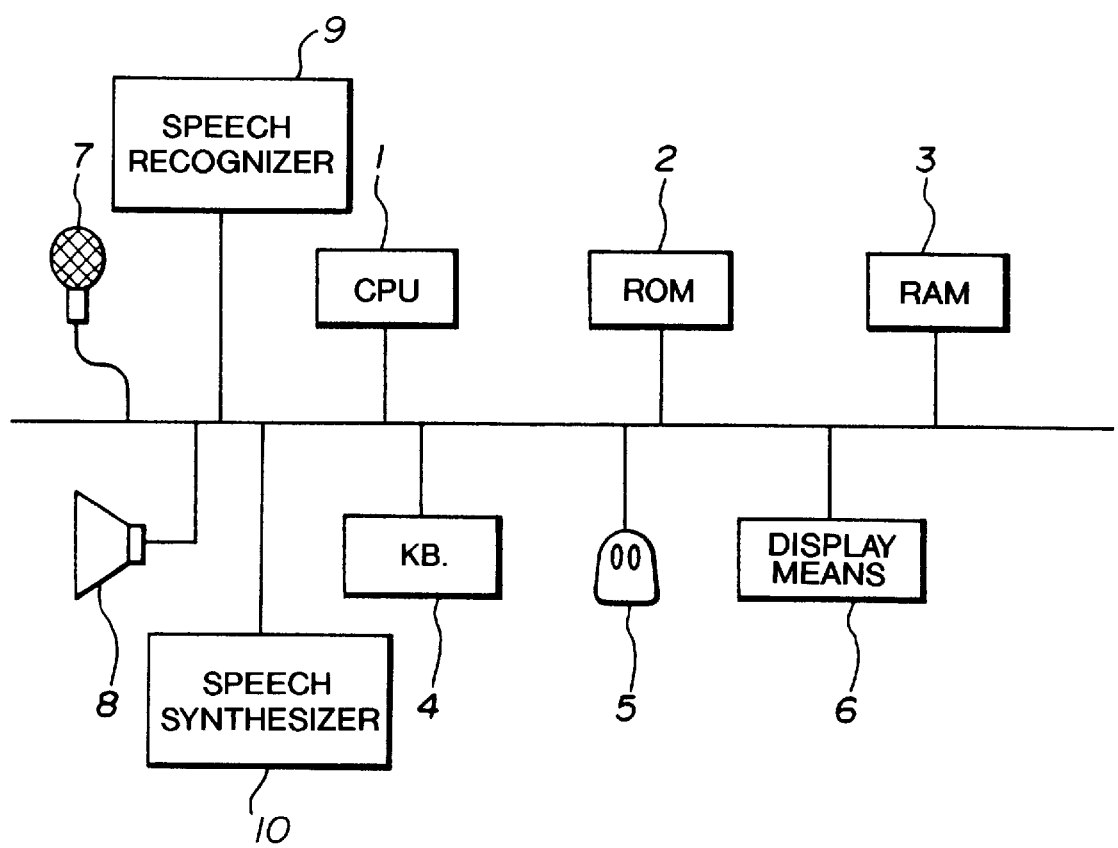
FIG. 12 is a block diagram illustrating the configuration of a speech-information processing apparatus.

FIG. 12 is a block diagram illustrating the configuration of a speech-information processing apparatus according to a first embodiment of the present invention.

In FIG. 12, a CPU (central processing unit) 1 controls the processing of the entire apparatus in accordance with control programs stored in a ROM (read-only memory) 2. The ROM 2 stores control programs for respective processing described in the present embodiment. A RAM (random access memory) 3 includes a portion for storing data, such as files, tables and the like, used in respective processing performed in the present embodiment, and a working-memory portion for storing data generated in the course of processing. A keyboard 4 is used for inputting code information for instructing respective processing, such as provision of labels to a speech file, and the like. A pointing device 5 is used for inputting information relating to the coordinates of a desired position. The pointing device 5 may, for example, have the shape of a pen for inputting a locus. Display means 6 displays information input from the keyboard 4 or the pointing device 5, information received in the apparatus, information in the course of processing, or a result of processing. A CRT (cathode-ray tube) or a liquid-crystal display is used as the display means 6. A microphone 7 is used for inputting a speech, serving as an object to be recognized by a speech recognizes a, or various kinds of command speechs. A speech synthesizer 10 synthesizes speech and a speaker 8 outputs the synthesized speech or a message speech.

The first embodiment will now be described with reference to the diagram illustrating the configuration of functional units shown in FIG. 1.

Figure 1:
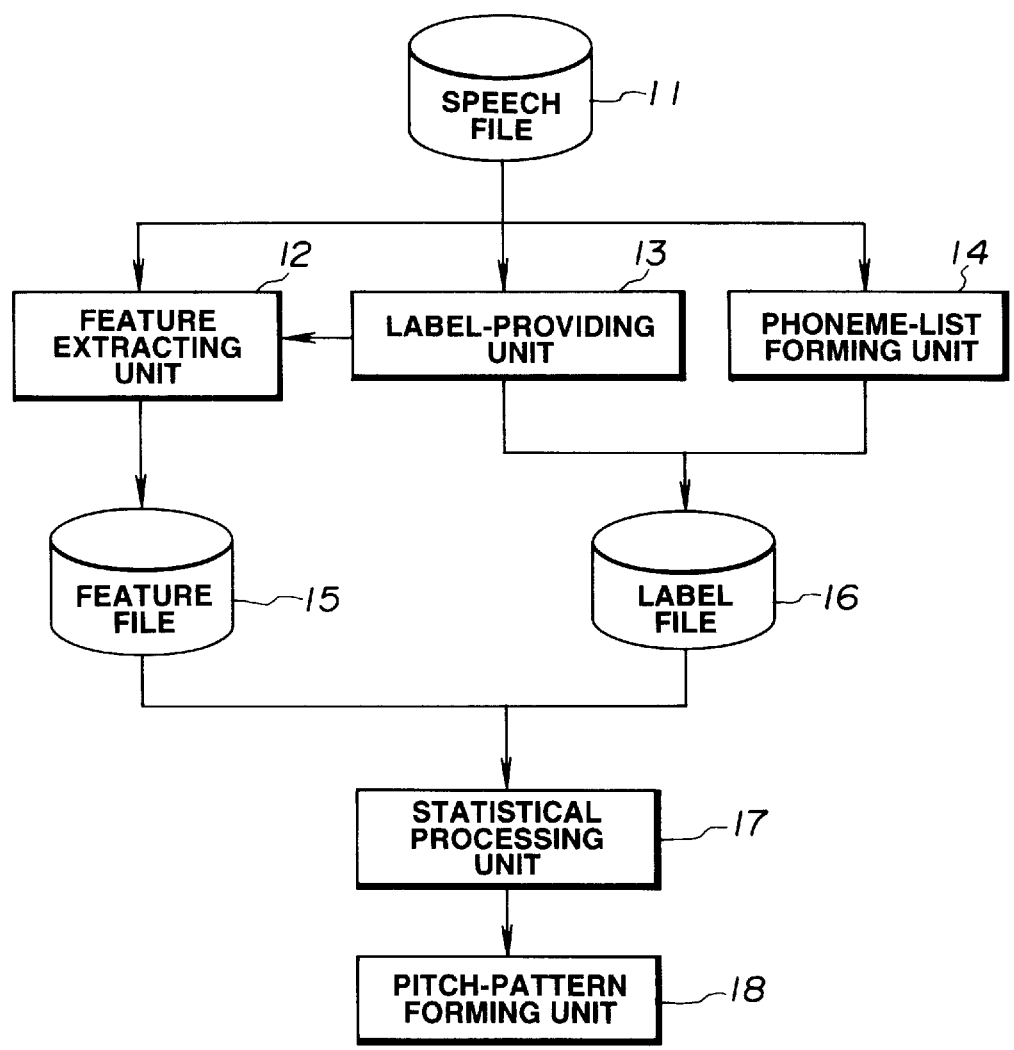
FIG. 1 is a diagram illustrating the configuration of functional units for forming a pitch pattern.

In FIG. 1, a speech file 11 stores a speech data base and the like. A feature extracting unit 12 extracts features from data stored in the speech file 11. A label providing unit 13 provides the data stored in the speech file 11 with the label of each phoneme. A phoneme-list forming unit 14 forms a phoneme list for the data stored in the speech file 11. A feature file 15 stores features of data stored in the speech file 11 and extracted by the feature extracting unit 12 together with a speech-file number. A label file 16 stores data for each label formed from data obtained from the label providing unit 13 and the phoneme-list forming unit 14. A statistical processing unit 17 performs statistical processing based on data stored in the feature file 15 and the label file 16. A pitch-pattern forming unit 18 forms a pitch pattern using data obtained from the statistical processing unit 17.

Each processing performed by the above-described configuration will now be described in detail with reference to drawings indicating data generated in the processing.

First, by one of a method in which the operator visually inputs label data for data displayed on the display means 6 through the keyboard 4 or the like, and a method in which control is performed by a program. As shown in FIG. 2, a label is provided for each phoneme of data of the speech data base or the like stored in the speech file 11. For example, since data "aki" having a speech-file number 1 (to be described later in detail with reference to FIG. 3) comprises a phoneme "a", a phoneme "k", and a phoneme "i", labels are determined as times "100–149" for the phoneme "a", times "150–179" for the phoneme "k", and times "180–200" for the phoneme "i".

The phoneme list forming unit 14 forms, as shown in FIG. 3, a phoneme list comprising the accent type, the number of moras, the phoneme category and the like for each speech-file number (for example, in units of a word). For example, the phomene list for the data "aki" having the speech-file number 1 is determined such that the number of moras is "2", and the accent type is a "0 type".

Data for each label as shown in FIG. 4, in which the phoneme environment, comprising the accent type, the number of moras, the mora position, the phoneme category and the like, all considered, is formed from data obtained from the label providing unit 13 and the phoneme-list forming unit 14, and is stored in the label file 16.

The feature extracting unit 12 displays data stored in the speech file 11 on the display means 6. By one of the method in which the operator visually inputs label data for the displayed data through the keyboard 4 or the like, and the method in which control is performed by a program, features, such as the fundamental frequency, the power, variations in these values (the delta pitch and the delta power), and the like, are extracted, and the feature file 15 is formed.

The feature extracting unit 12 may use a method in which utilizing label information provided by the label providing unit 13, the fundamental frequency is extracted in accordance with voice/voiceless sound/no sound, for example, by providing specific codes for a voiceless interval and a soundless interval.

The statistical processing unit 17 performs stastical processing based on data stored in the feature file 15 and the label file 16, and the pitch-pattern forming unit 18 forms a pitch pattern.

The fundamental frequency (or logarithmic transformation thereof), power, duration, spectral information (cepstrum, LPC coefficient and the like), linear regression coefficients and quadratic regression coefficients of these values, and the like may be utilized as parameters representing features, and statistical processing can be performed by arbitrary combination of these parameters.

Normalized data of the above-described features, such as the logarithmic fundamental frequency, the power and the like, for each data, each category or all data may also be used.

As an example in the present embodiment, a description will be provided of a case in which the phoneme-list forming unit 14 forms a phoneme list using the accent type, the number of moras, and the mora position, and the feature file 15 uses only the logarithmic fundamental frequency. FIG. 5 illustrates a pitch pattern table when the context dependent HMM; i.e., the accent type, the number of moras, and the mora position (a continuous HMM of three states/three loops per mora) is used. In the present embodiment, the phoneme environment is subjected to statistical processing by being classified according to the accent type, the number of moras, and the mora position.

Figure 6:
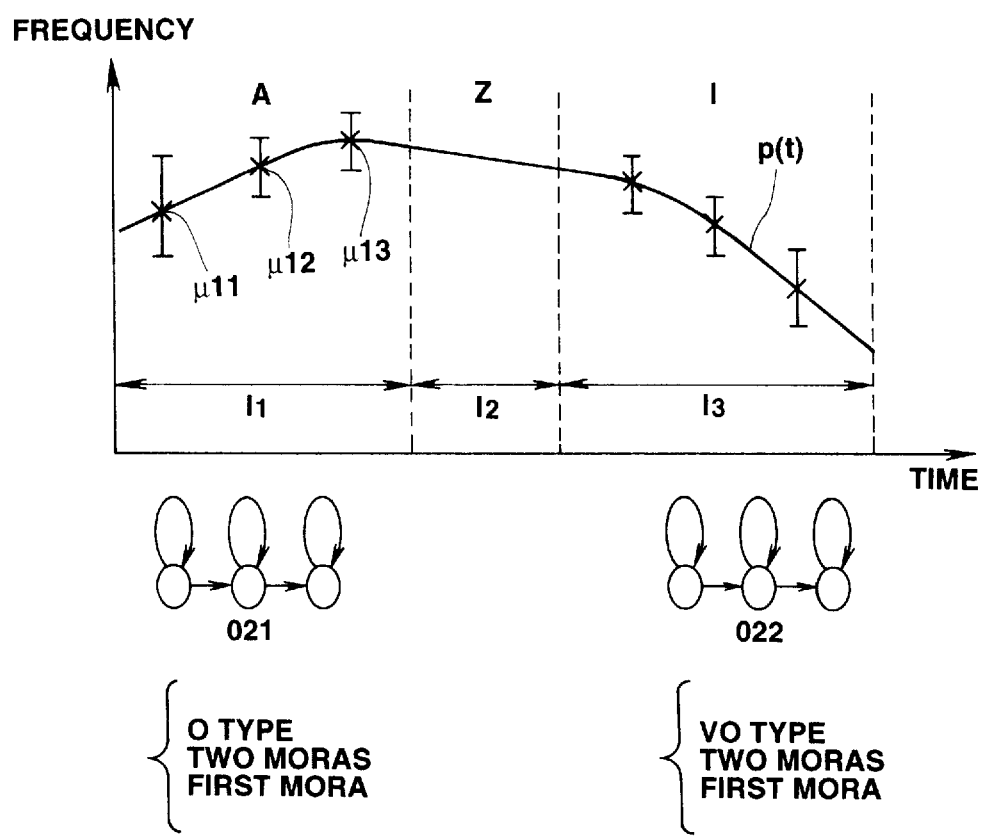
FIGS. 6 and 7 are diagrams each illustrating an example of formation of a pitch pattern using the context dependent HMM, i.e.; the accent type, the number of moras, and the mora position.
Figure 7:
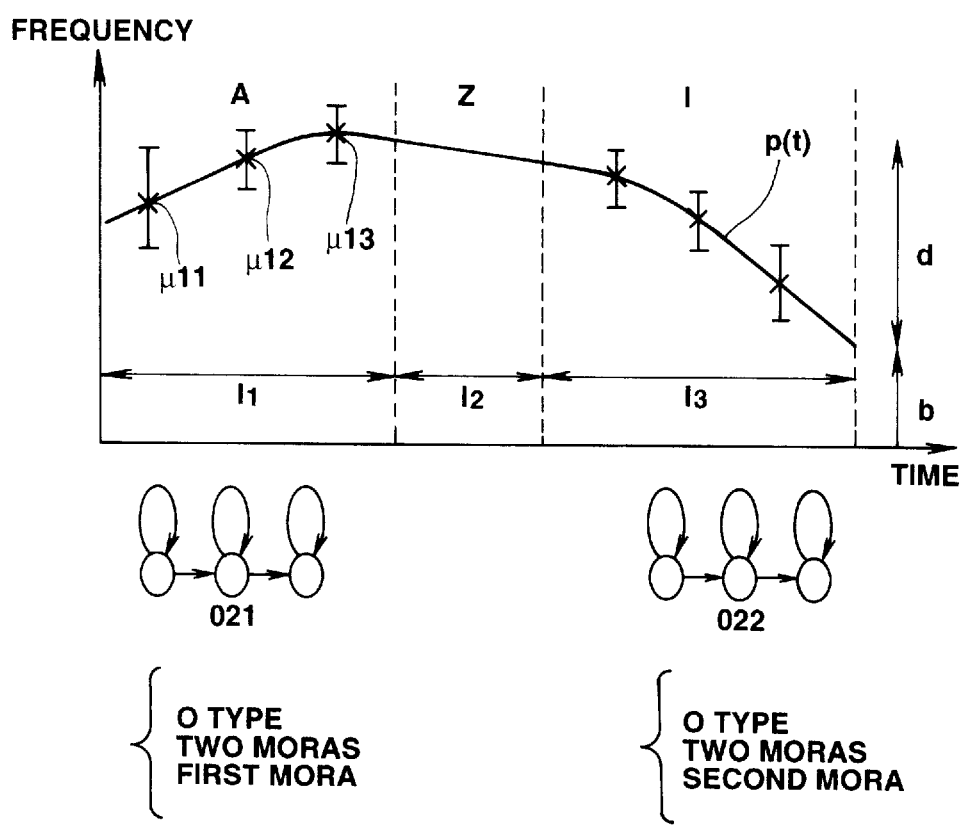

Next, a description will be provided of procedures of forming a pitch pattern for "AZI" by the pitch-pattern forming unit 18 with reference to FIGS. 6 and 7.

1. Models (021, 022) corresponding to the phoneme environment are selected. Since the number of moras is 2 and the accent type is the 0 type for "AZI", data having the mora positions 1 and 2 in that phoneme environment is selected.

2. The states of the selected models are arranged in accordance with the duration ($1_1$, $1_2$, $1_3$) of phonemes.

3. Point pitches are determined using the mean values ($\mu_{11}, \mu_{12}, \mu_{13}$ and the like) of the frequencies of the respetive states.

4. The point pitches are interpolated (interpolation for a voiced consonant is performed using two vowels adjacent to the consonant), and a pitch pattern as shown in FIG. 6 is formed.

5. If the features are extracted from the normalized fundamental frequency, as shown in FIG. 7, the pitch pattern shown in FIG. 6 is multiplied by a dynamic range (d), and a bias (b) is added.

In this operation, allocation of time for three states (one phoneme) in each model is performed by a method of simply dividing the entire time into three equal portions, a method of distributing the time in proportion to the ratio of the transition probability, a method of dividing the time in proportion to the ratio of statistical durations which can be obtained from the Viterbi decoding algorithm by passing the obtained model through learning data, or the like. Fundamental frequency contours can be formed for the pitch pattern models for which the time is distributed using one of various kinds of interpolation operations, such as linear interpolation, spline interpolation and the like. At that time, pitch pattern correction in consideration of variance can also be performed.

Second Embodiment

In the above-described first embodiment, the phoneme environment of a phoneme list formed by the phoneme-list forming unit 14 comprises the accent type, the mora type, and the mora position. A description will now be provided of a second embodiment of the present invention in which a phoneme list is formed in consideration of an environment including a phoneme or a phoneme category (hereinafter termed a "phoneme category" inclusive of the phoneme) in addition to the above-described items, and the feature file 15 uses only the logarithmic fundamental frequency. FIG. 8 illustrates a pitch pattern table when the phoneme context dependent HMM in which the accent type, the number of moras, the mora position, and the phoneme category are considered (a continuous HMM having three states/three loops per mora is used). In the present embodiment, the phoneme environment is subjected to statistical processing by being classified according to the accent type, the number of moras, the mora position, and the phoneme category.

Figure 9:
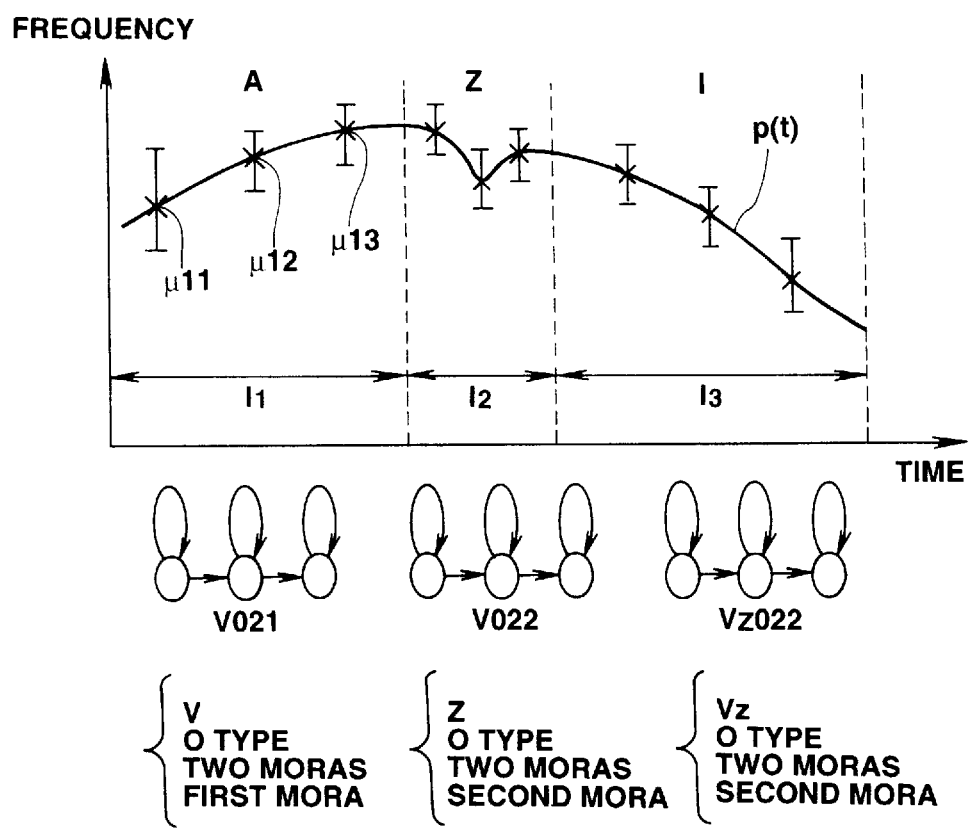
FIGS. 9 and 10 are diagrams each illustrating an example of formation of a pitch pattern using the phoneme context dependent HMM; i.e., the phoneme category, the accent type, the number of moras, and the mora position.
Figure 10:
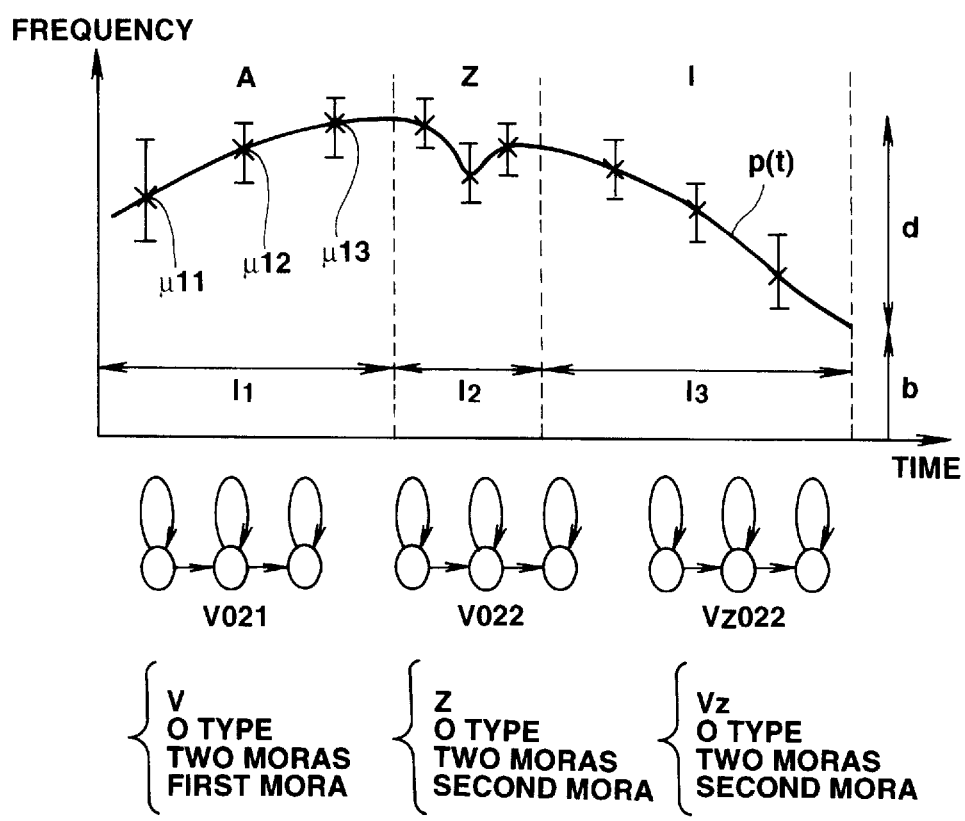

Next, a description will be provided of procedures for forming a pitch pattern by the pitch-pattern forming unit 18 shown in FIG. 1 with reference to FIGS. 9 and 10.

1. Models (V021, V022, Vz022) corresponding to phoneme environment are selected.

2. The states of the selected models are arranged in accordance with the duration ($1_1$, $1_2$, $1_3$) of phonemes.

3. Point pitches are determined using the mean values ($\mu_{11}, \mu_{12}, \mu_{13}$ and the like) of the frequencies of the respetive states.

4. The point pitches are interpolated, and a pitch pattern as shown in FIG. 9 is formed.

5. If the features are extracted from the normalized fundamental frequency, as shown in FIG. 10, the pitch pattern shown in FIG. 9 is multiplied by a dynamic range (d), and a bias (b) is added.

The time allocation and interpolation can be performed in the same manner as in the above-described first embodiment.

Third Embodiment

For a category having a large amount of data, a pitch pattern which is more precise than in the first embodiment can be generated, for example, by taking into consideration of the phoneme environment of phonemes before and after the concerned phoneme.

Fourth Embodiment

Since fine changes in a phoneme can be more precisely expressed by dividing the phoneme into a large number of fine classes, improvement in hearing can be expected. However, in some cases, the HMM cannot be formed for fine phoneme classes because of limitation in the amount of data. Accordingly, when performing systematic speech synthesis using such phonemes, it is necessary to adopt a multihierarchy configuration, and to generate a pitch pattern utilizing upper-hierarchy models when phoneme environment models to be synthesized are not present in low hierarchies consisting of fine classes.

By hierarchically configuring pitch pattern models obtained in the above-described first, second and third embodiments, it is possible to select a pitch pattern corresponding to the amount of data, and to utilize more precise pitch pattern models as the amount of data increases, with the same configuration irrespective of the amount of data.

Figure 11:
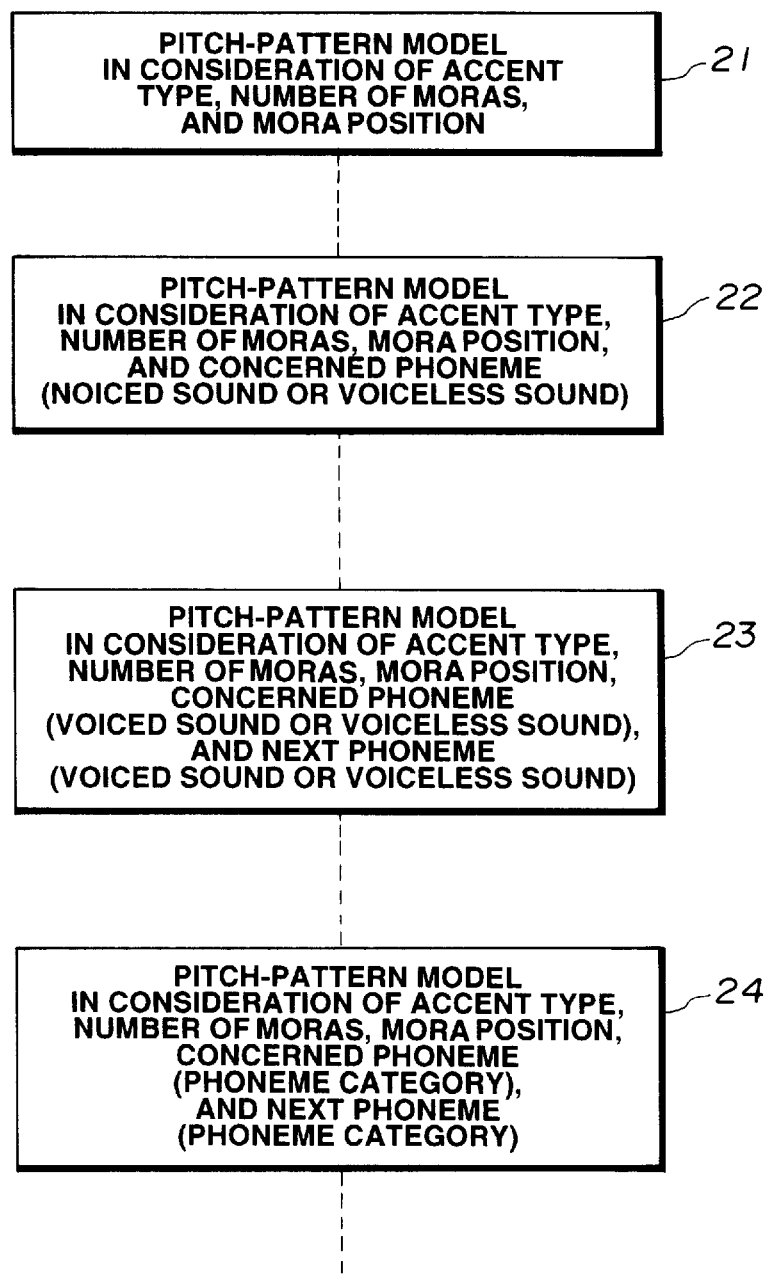
FIG. 11 is a diagram illustrating a hierarchical structure of a pitch pattern.

FIG. 11 illustrates the hierarchical structure of pitch patterns. In FIG. 11, reference numeral 21 indicates classes of a pitch pattern generated in the first embodiment. Reference numeral 22 indicates classes of a pitch pattern generated when the concerned phoneme is classified into two kinds; i.e., a voiced sound and a voiceless sound, as the phoneme environment, according to an example of the second embodiment. Reference numeral 23 indicates classes of a pitch pattern generated when the concerned phoneme and the next phoneme are classified into two kinds; i.e., a voiced sound and a voiceless sound, as the phoneme environment, according to an example of the third embodiment. Reference numeral 24 indicates classes of a pitch pattern generated when the concerned phoneme and the next phoneme are classified according to phoneme categories (voiceless fricative, voiced plosive and the like), according to another example of the third embodiment.

The hierarchical structure shown in FIG. 11 only is an example of the present invention. For example, the phoneme category of the phoneme before the concerned phoneme may be considered. In another approach, different models may be adopted for respective classes, or any model shown in FIG. 11 may be deleted.

Fifth Embodiment

When performing voice recognition utilizing prosodic information, by comparing a pitch pattern in one of the first through fourth embodiments with a pronounced pitch pattern, it is possible to determine the phoneme and the accent type, and to improve the speech recognition rate. At that time, it is necessary to prepare a dictionary for recognition including accent types.

For example, when recognizing in word speech recognition words " 橋(hashi, 0 type)" and " 箸(hashi, 1 type)" which have the same reading and the same number of moras but have different accent types, the accent type can be determined by extracting the fundamental frequency from the pronounced voice and performing identification using a model having a pitch pattern of two moras/0 type and two moras/1 type from among pitch patterns generated in the first embodiment.

As another example, when recognizing words "みぶん(mibun, 1 type)" and "くぶん(kubun, 1 type) which have the same number of moras and the same accent type but have different consonants in the first mora, by extracting the fundamental frequency from the pronounced speech and using two models having categories of three moras/1 type and consonants m and k in the first mora from among pitch patterns generated in the second embodiment or the third embodiment, probability is obtained from the viewpoint of the pitch pattern. By evaluating the probability together with spectral information, it is possible to increase the speech recognition rate.

It is also possible to extract the boundary between accent phrases using a pitch pattern model generated in the first embodiment.

The individual components designated by blocks in the drawings are all well known in the speech-information processing method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A speech-information processing method comprising the steps of:
    performing statistical processing of stored speech data with respect to a phoneme environment parameter corresponding to a set of characteristics of a hierarchical configuration of sets of characteristics for each phoneme using a feature file formed by extracting features from the speech data, and a label file obtained by analyzing the speech data so as to be processed for each phoneme environment parameter; and
    forming a pitch pattern, in which the phoneme environment parameter is considered, based on the data subjected to the statistical processing.

2. A method according to claim 1, wherein the statistical processing uses a context dependent HMM (Hidden Markov Model).

3. A method according to claim 1, further comprising the step of using the formed pitch pattern for systematic speech synthesis.

4. A method according claim 1, wherein the step of forming the pitch pattern includes forming a pitch pattern for a concerned phoneme by considering the phoneme environment parameter of a phoneme preceding the concerned phoneme, and the phoneme environment parameter of a phoneme succeeding the concerned phoneme.

5. A method according to claim 1, wherein the step of forming the pitch pattern includes the step of generating pitch pattern models for forming the pitch pattern and the step of hierarchically configuring the generated pitch pattern models.

6. A method according to claim 1, further comprising the step of comparing a formed pitch pattern with a pitch pattern of a speech input as an object to be recognized, and outputting an analogous pitch pattern as a result of recognition of the input speech.

7. A method according to claim 1, wherein an accent type is considered in the phoneme environment parameter.

8. A method according to claim 1, wherein the number of moras is considered in the phoneme environment parameter.

9. A method according to claim 1, wherein a mora position is considered in the phoneme environment parameter.

10. A method according to claim 1, wherein phonemes are considered in the phoneme environment parameter.

11. (Amended) A method according to claim 1 wherein a phoneme category is considered in the phoneme environment parameter.

12. A speech-information processing apparatus comprising:
    speech-file storage means for storing speech data;
    feature extraction means for forming a feature file by extracting features from the speech data stored in said speech file;
    analysis means for analyzing the speech data so as to be processed for each phoneme; and
    statistical processing means for performing statistical processing of the speech data stored in said speech file in consideration of a phoneme environment parameter corresponding to a set of characteristics of a hierarchical configuration of characteristic sets for each phoneme using data obtained from said feature extraction means and said analysis means; and
    pitch-pattern forming means for forming a pitch pattern, in which the phoneme environment parameter is considered, based on data obtained from said statistical processing means.

13. An apparatus according to claim 12, wherein the statistical processing uses a context dependent HMM.

14. An apparatus according to claim 12, further comprising means using the formed pitch pattern for systematic speech synthesis.

15. An apparatus according to claim 12, wherein said pitch-pattern forming means comprises means for forming a pitch pattern for a concerned phoneme in consideration of the phoneme environment parameter of a phoneme preceding the concerned phoneme and the phoneme environment parameter of a phoneme succeeding the concerned phoneme.

16. An apparatus according to claim 12, wherein said pitch-pattern forming means includes means for generating pitch pattern models and means for hierarchically configuring the pitch pattern models.

17. An apparatus according to claim 12, further comprising means for comparing a formed pitch pattern with a pitch pattern of a speech input as an object to be recognized, and means for outputting an analogous pitch pattern as a result of recognition of the input speech.

18. An apparatus according to claim 12, wherein an accent type is considered in the phoneme environment parameter.

19. An apparatus according to claim 12, wherein the number of moras is considered in the phoneme environment parameter.

20. An apparatus according to claim 12, wherein a mora position is considered in the phoneme environment parameter.

21. An apparatus according to claim 12, wherein phonemes are considered in the phoneme environment parameter.

22. An apparatus according to claim 12, wherein a phoneme category is considered in the phoneme environment parameter.

23. A computer usable medium having computer readable instructions stored therein for speech-information processing of stored speech data, the instructions comprising:

a first set of instructions for causing statistical processing of the stored speech data with respect to a phoneme environment parameter corresponding to a set of characteristics of a hierarchical configuration of sets of characteristics of a phoneme using a feature file formed by extracting features from the stored speech data and a label file obtained by analyzing the stored speech data to be processed for each phoneme environment parameter; and a second set of instructions for causing formation of a pitch pattern considering the phoneme environment parameter and based on the data subjected to the statistical processing.

\* \* \* \* \*

UNITED STATES PATENT AND TRADEMARK OFFICE
CERTIFICATE OF CORRECTION

PATENT NO. : 5,845,047

DATED : December 1, 1998

INVENTOR(S): TOSHIAKI FUKADA, ET AL.

It is certified that error appears in the above-identified patent and that said Letters Patent is hereby corrected as shown below:

COLUMN 3,
Line 38, "recognizes a," should read --recognizer 9,--.

COLUMN 4,
Line 19, "all" should read --are--.

COLUMN 8,
Line 23, "and" should be deleted.

Signed and Sealed this

Twenty-first Day of September, 1999

Attest:

Q. TODD DICKINSON

*Attesting Officer*           *Acting Commissioner of Patents and Trademarks*